United States Patent
Cosentino et al.

(10) Patent No.: US 12,428,322 B2
(45) Date of Patent: *Sep. 30, 2025

(54) ELECTROLYTIC BIOCIDE-GENERATING UNIT WITH CIRCUIT COOLING AND WATER SEALING

(71) Applicant: ElectroSea, LLC, Wayzata, MN (US)

(72) Inventors: Louis Ciro Cosentino, Palm Beach Gardens, FL (US); Daniel L. Cosentino, Wayzata, MN (US); Brian Alan Golden, Eden Prairie, MN (US)

(73) Assignee: ElectroSea, LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/501,384

(22) Filed: Oct. 14, 2021

(65) Prior Publication Data

US 2022/0112105 A1    Apr. 14, 2022

Related U.S. Application Data

(60) Provisional application No. 63/091,852, filed on Oct. 14, 2020.

(51) Int. Cl.
*C02F 1/461* (2023.01)
*C02F 1/467* (2023.01)

(52) U.S. Cl.
CPC ........ *C02F 1/46104* (2013.01); *C02F 1/4674* (2013.01); *C02F 2201/004* (2013.01);
(Continued)

(58) Field of Classification Search
CPC ................ C02F 1/46104; C02F 1/4674; C02F 2201/004; C02F 2201/008;
(Continued)

(56) References Cited

U.S. PATENT DOCUMENTS

| | | | |
|---|---|---|---|
| 7,695,613 B2 | 4/2010 | Doyle et al. | |
| 8,817,471 B2 * | 8/2014 | Barna | A62C 37/36 174/547 |

(Continued)

FOREIGN PATENT DOCUMENTS

| | | | | |
|---|---|---|---|---|
| KR | 200306382 Y1 * | 5/2003 | | |
| KR | 101815271 B1 * | 1/2018 | | |
| KR | 2020039421 A * | 4/2020 | | C02F 1/325 |

OTHER PUBLICATIONS

Fernco, Multi-Tite Pipe Gaskets, pp. 1-2, Apr. 13, 2016 (Year: 2016).*

(Continued)

*Primary Examiner* — Robert J Popovics
(74) *Attorney, Agent, or Firm* — Merchant & Gould P.C.

(57) ABSTRACT

The present disclosure relates to a biocide-generating device for outputting a biocide to a water system. The biocide-generating device includes a housing having a water inlet for receiving water from the water system and a water outlet for outputting water containing biocide to the water system. The biocide-generating device also includes an electrode arrangement having first and second electrodes positioned in the housing for generating biocide in the water within the housing, and an electrical power circuit for establishing a flow of electrical current between first and second electrodes of the electrode arrangement for generating the biocide in the water within the first chamber electrolytic cell. Features for enhancing heat transfer, sealing and electrical isolation are incorporated into the biocide-generating device.

25 Claims, 14 Drawing Sheets

(52) U.S. Cl.
CPC .................. *C02F 2201/008* (2013.01); *C02F 2201/4616* (2013.01); *C02F 2303/04* (2013.01); *C02F 2303/20* (2013.01)

(58) Field of Classification Search
CPC .......... C02F 2201/4616; C02F 2303/04; C02F 2303/20; C02F 2001/46142; C02F 2201/001; C02F 2201/4613; C02F 2201/4614; C02F 2201/46145; C02F 2209/02
See application file for complete search history.

(56) References Cited

U.S. PATENT DOCUMENTS

| | | | | |
|---|---|---|---|---|
| 9,531,184 | B2* | 12/2016 | Borovinov | H02H 5/043 |
| 10,294,686 | B1* | 5/2019 | Erlich | E04H 4/1654 |
| 11,027,991 | B2 | 6/2021 | Cosentino et al. | |
| 11,345,621 | B2 | 5/2022 | Cosentino et al. | |
| 11,498,855 | B2* | 11/2022 | Cosentino | C02F 1/4606 |
| 2009/0321251 | A1* | 12/2009 | Rigby | C02F 1/46114 |
| | | | | 205/744 |
| 2012/0132573 | A1* | 5/2012 | Lautzenheiser | C02F 1/008 |
| | | | | 210/85 |
| 2013/0120102 | A1* | 5/2013 | Barna | A62C 3/16 |
| | | | | 169/56 |
| 2019/0106339 | A1* | 4/2019 | Cosentino | C02F 1/46104 |
| 2020/0079658 | A1* | 3/2020 | Weber | B01D 35/30 |
| 2020/0325041 | A1* | 10/2020 | Cosentino | C02F 1/46104 |
| 2021/0331948 | A1 | 10/2021 | Cosentino et al. | |
| 2022/0112105 | A1* | 4/2022 | Cosentino | C02F 1/46104 |

OTHER PUBLICATIONS

Fastener, Design Tips: Fasteners For Printed Circuit Boards, May 1, 2017 (Year: 2017).*
PCB, The Basics Of Printed Circuit Boards: Design, Components And Construction, Aug. 26, 2018 (Year: 2018).*
English Machine Translation of Ahn KR200306382 Y1 (Year: 2003).*
Choi, KR101815271 B1, English machine translation (Year: 2018).*
Bong, KR2020039421 A, English machine translation (Year: 2020).*

* cited by examiner

ELECTROLYTIC BIOCIDE-GENERATING UNIT WITH CIRCUIT COOLING AND WATER SEALING

CROSS REFERENCE TO RELATED APPLICATIONS

The present application claims the benefit of U.S. Provisional Patent Application No. 63/091,852 filed Oct. 14, 2020, the disclosure of which is hereby incorporated by reference herein in its entirety.

TECHNICAL FIELD

The present disclosure relates generally to biocide-generating devices for reducing or eliminating biofouling within water systems.

BACKGROUND

Bio-fouling caused by bio-growth (e.g., salt water or fresh water marine growth) can result in the clogging of water systems, and the inefficient operation, overheating, and malfunction of equipment dependent upon the water systems thereby leading to costly downtime and expensive repair. For some applications, the issue of bio-growth within water systems is addressed by periodic (e.g., semi-annual) acid cleaning of the water systems. Acid cleaning is expensive, time consuming, and involves the use of harsh and hazardous chemicals. Improvements in this area are needed.

SUMMARY

One aspect of the present disclosure relates to a biocide-generating system for inhibiting biofouling within a water system. In one non-limiting example, the system can be a water system of a watercraft such that related equipment (e.g., a heat exchanger) of the watercraft can be operated at peak performance with minimal to no downtime. In certain examples, the biocide-generating system can include an electrolytic arrangement for providing the in situ generation of biocide within the water passing through the water system. Biocide-generating systems in accordance with the principles of the present disclosure can be used for both salt water (e.g., sea and brackish water) as well as freshwater applications.

Aspects of the present disclosure relate to electrolytic biocide-generating devices and systems having features for ensuring electrical isolation of the electrodes from outer housings and/or other components of the devices and systems.

Aspects of the present disclosure relate to electrolytic biocide-generating devices and systems having features for providing effective sealing between electrolysis chambers and circuit housing chambers of the biocide-generating devices.

Aspects of the present disclosure relate to an electrolytic biocide-generating device having features for effectively transferring heat from a chamber of the device that houses power and control circuitry to a chamber of the device through which water flows and in which electrolysis occurs.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows.

DETAILED DESCRIPTION

Figure 1:
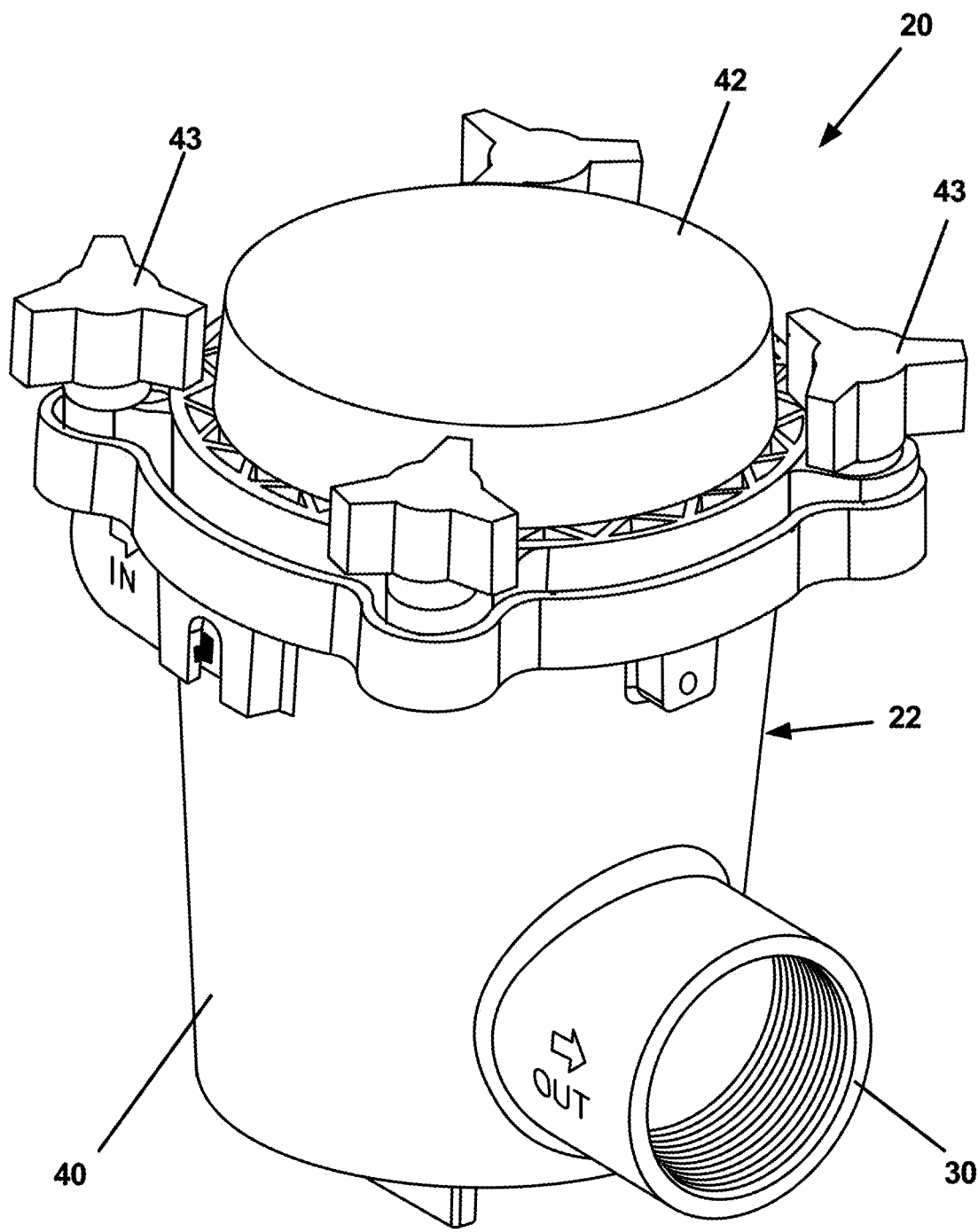
FIG. 1 illustrates a biocide-generating device (e.g., a biocide-generating unit) suitable for practicing aspects of the present disclosure.
Figure 2:
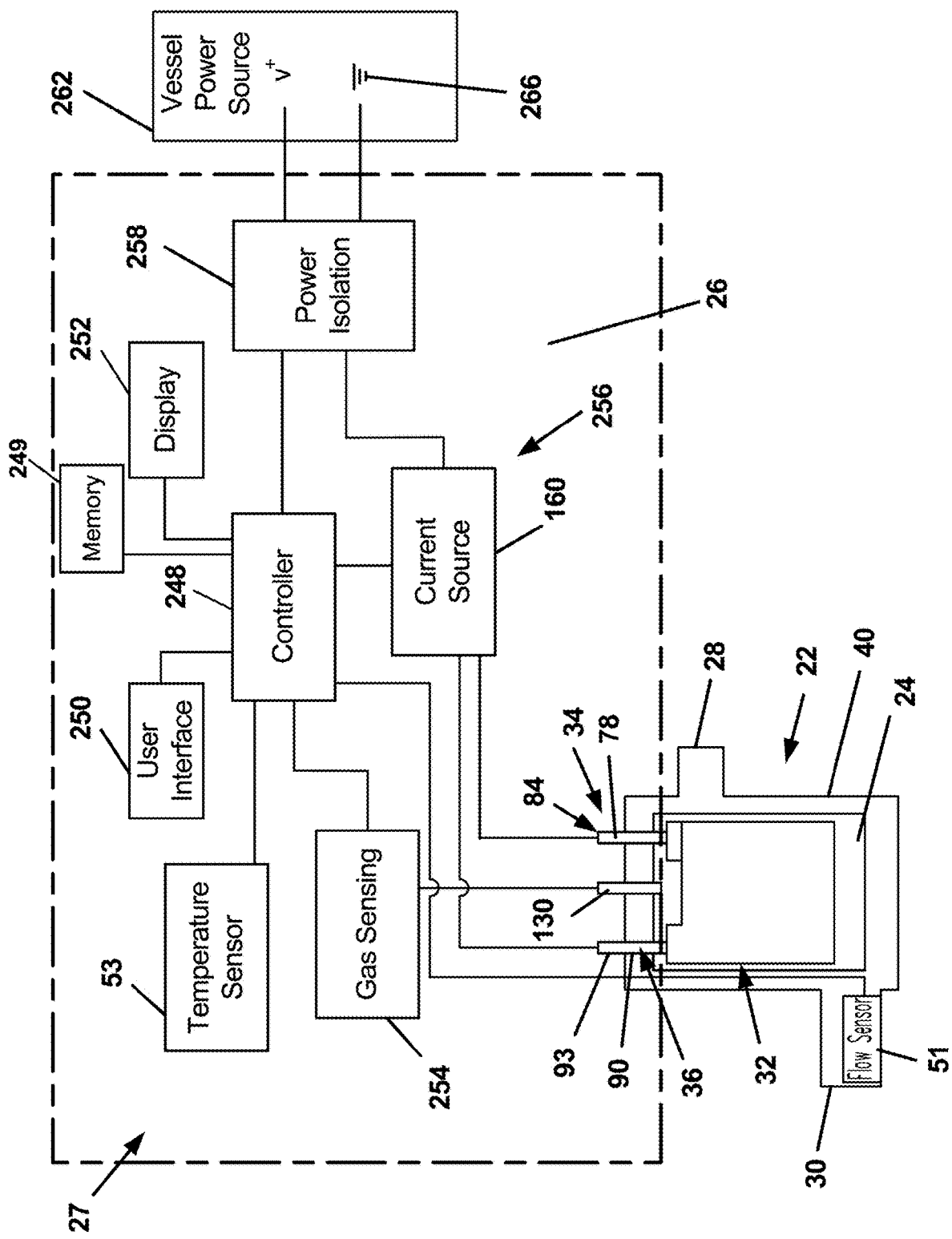
FIG. 2 is a schematic view of the biocide-generating device of FIG. 1.

FIGS. 1-2 depict an example biocide-generating unit 20 (e.g., a biocide-generating device) in accordance with principles of the present disclosure. The biocide-generating unit 20 includes a unit housing 22 defining a first chamber 24 and a second chamber 26 (see FIGS. 2 and 4). The first chamber 24 provides a location within the unit housing 22 in which biocide can be generated, and the second chamber 26 provides a housing location for circuitry 27 that controls operation of the biocide-generating unit. The unit housing 22 includes a water inlet 28 for receiving water into the first chamber 24 and a water outlet 30 for outputting water containing biocide generated within the first chamber 24 to a water system desired to be treated with biocide (e.g., a water system of a watercraft which may include a heat exchanger for an air conditioner or chiller). The biocide-generating unit 20 also includes an electrode arrangement 32 including first and second electrodes 34, 36 positioned in the first chamber 24 for generating biocide in the water flowing through the first chamber 24 between the water inlet 28 and the water outlet 30 when a voltage is applied across the first and second electrodes 34, 36. Power leads 38 extend outwardly from the unit housing 22. The power leads 38 are adapted for coupling the circuitry 27 within the second chamber 26 to an external power source 262 having its own ground 266. The power source 262 can be a battery, generator, or other power source. In certain examples, the power source can range from 12-240 volts and can provide alternating current (AC) or direct current (DC). Preferred power sources include 12 volt DC, or 24 volt DC, or 110 volt AC or 240 volt AC power sources. At FIG. 4, the circuitry 27 is shown integrated as part of a multi-layer circuit board 29. In certain examples, one or more flow sensors 51 can be used to sense the rate of flow of water through the electrolytic cell, and one or more temperature sensors 53 can be used to sense the temperature of the circuitry 27, the chamber 26, and/or portions of the unit housing 22. Power to the cell can be reduced or terminated by a cell controller when low or no flow conditions are detected and/or when temperatures exceed predetermined levels.

Figure 3:
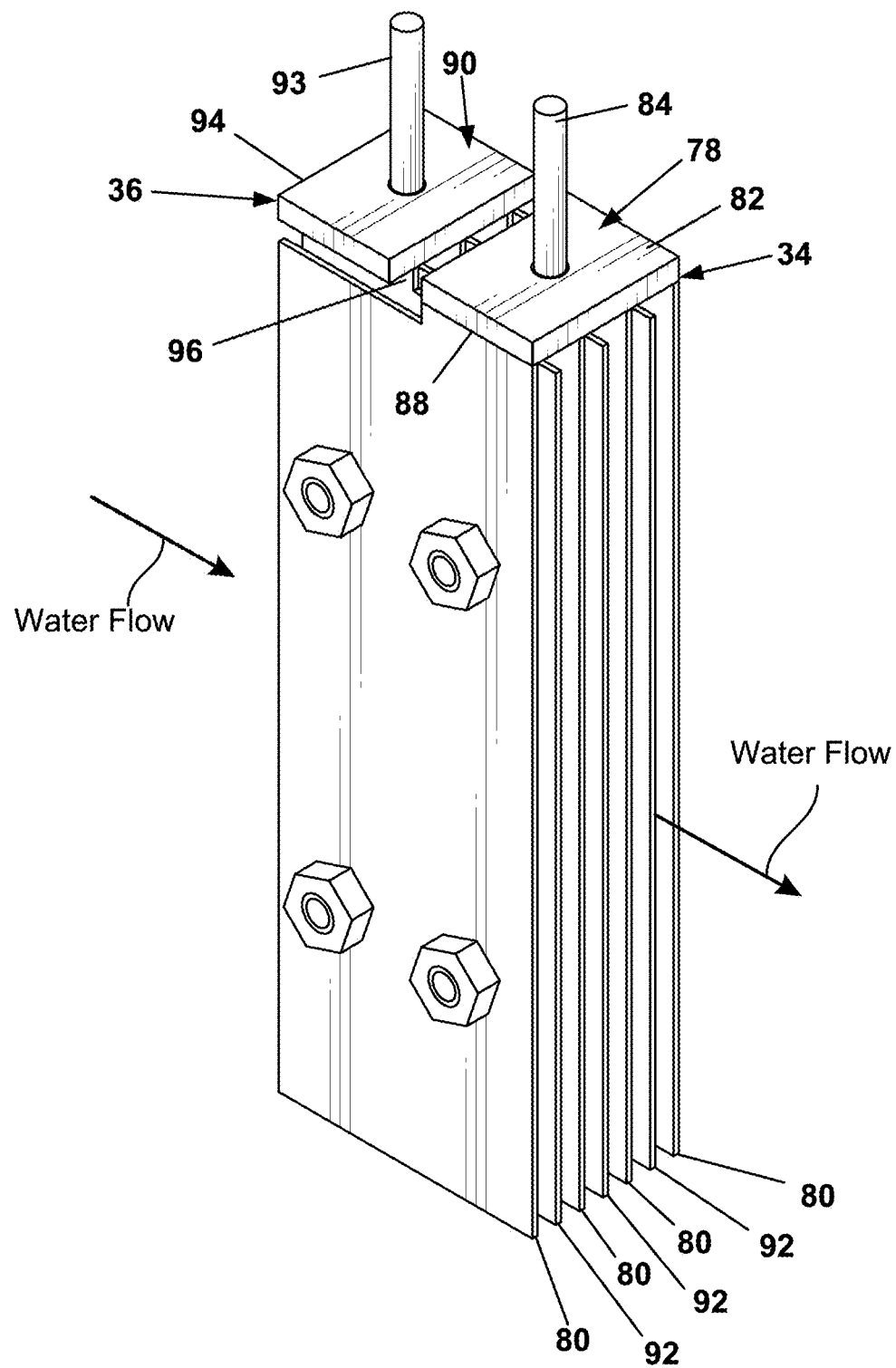
FIG. 3 is a perspective view illustrating an example configuration for an electrode arrangement of the biocide-generating device of FIGS. 1 and 2.

Referring to FIG. 3, the first electrode 34 can include a first terminal 78 electrically coupled to a plurality of parallel first electrode plates 80. The first terminal 78 includes a first terminal block 82 and a first terminal post 84. The first electrode plates 80 are electrically and mechanically coupled to the first terminal block 82. In one example, the first electrode plates 80 include main bodies 86 and upper tabs 88. The upper tabs 88 are preferably electrically and mechanically coupled to the first terminal block 82 by means such as welding or soldering.

Referring still to FIG. 3, the second electrode 36 can have a similar configuration as the first electrode 34. For example, the second electrode 36 includes a second terminal 90 and parallel second electrode plates 92 that are electrically and mechanically coupled to the second terminal 90. The second electrode plates 92 are positioned between the first electrode plates 80 and spaced-apart in relation to the first electrode plates 80 such that interstitial space exists between each of the first electrode plates 80 and a corresponding one of the second electrode plates 92. The second terminal 90 includes a second terminal block 94 electrically and mechanically coupled to upper tabs 96 of the second electrode plates 92. The second electrode plates 92 also include main bodies 98 and the second terminal 90 includes a second terminal post 93.

In certain examples, the terminal posts, the terminal blocks and the terminal plates can have metal constructions that include a metal material such as titanium or stainless steel. In certain examples, the first and second electrode plates 80, 92 can be coated with a catalyst material for catalyzing the production of chlorine or derivatives thereof. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium and/or oxides of titanium and/or oxides of tantalum and/or oxides of niobium. It will be appreciated that the above catalysts are merely examples and that other catalyst mixtures can also be used. In other examples, at least one of the sets of electrode plates 80, 92 is constructed of a material that includes copper such that copper ions are generated when voltage is applied across the plates 80, 92.

The circuitry 27 within the second chamber 26 can provide a number of functions. Example functions include: a) power conversion (e.g., DC-DC and/or AC-DC power conversion); b) power regulation; c) electrode polarity switching; d) periodically terminating power to the electrodes and connecting the electrodes together and to a zero reference voltage; e) isolating the circuitry from boat ground; f) gas sensing; g) monitoring water flow through the biocide-generating unit 20; and h) adjusting the magnitude of the electrical current flowing across the electrodes based on the water flow through the first chamber 24. To coordinate and implement this various functionality, the circuitry 27 can include a controller (e.g., controller 248) having one or more processors. The processors can interface with software, firmware, and/or hardware. Additionally, the processors can include digital or analog processing capabilities and can interface with memory 249 (e.g., random access memory, read-only memory, or other data storage). In certain examples, the processors can include a programmable logic controller, one or more microprocessors, or like structures. The processors can also interface with displays 252 (e.g., indicator lights, etc.) and user interfaces 250 (e.g., control buttons, switches, etc.) mounted at an exterior of the unit housing 22. In certain examples, information relating to previous operating cycles can be stored in the memory 249 and can be used by the controller 248 to coordinate operating aspects of the previous operating cycles with future operating cycles.

Figure 4:
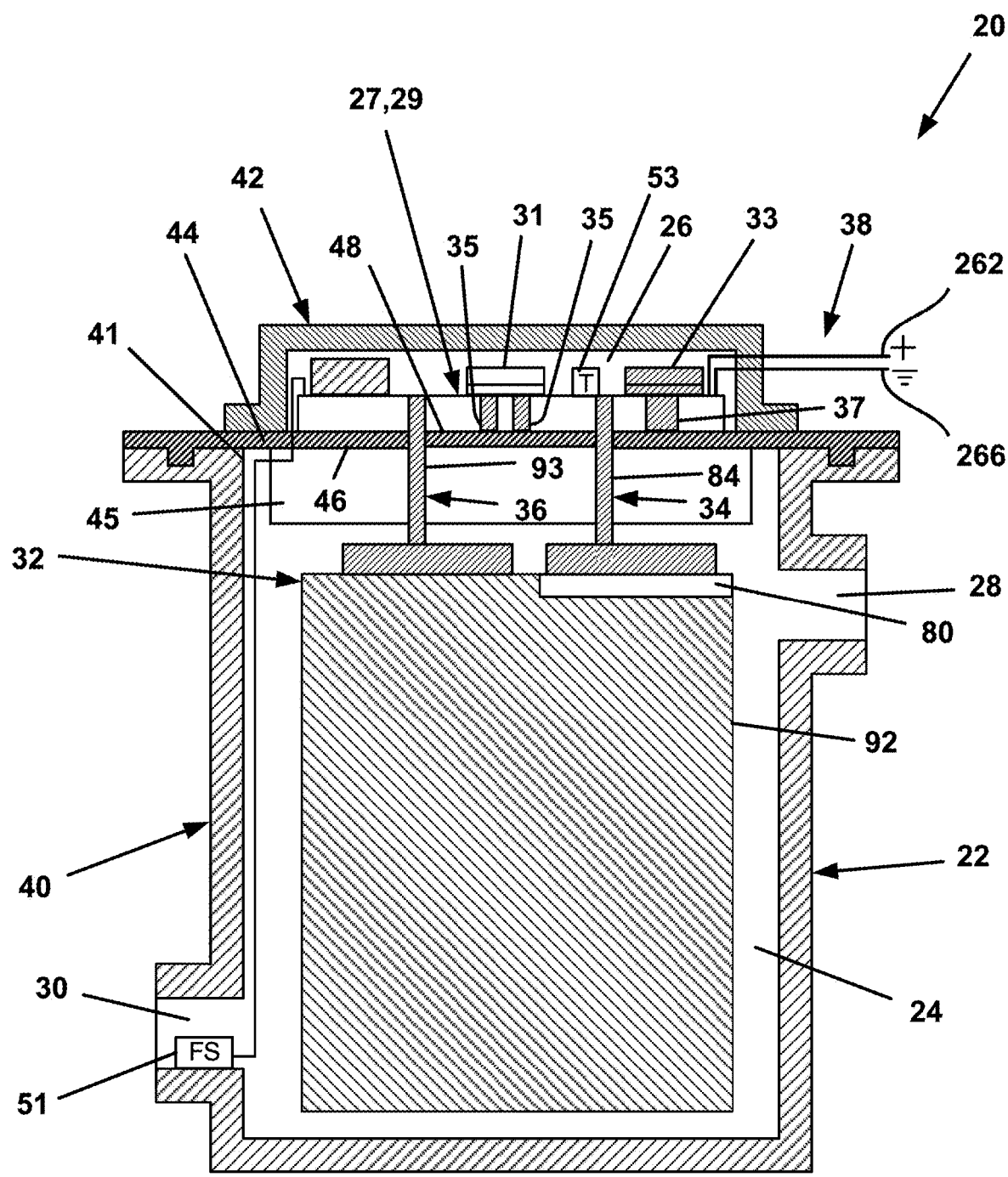
FIG. 4 is a cross-sectional view showing an example arrangement for the biocide-generating device of FIGS. 1-2.

Referring to FIG. 4, the unit housing 22 includes a main housing body 40 defining the first chamber 24. The main housing body 40 has an open end 41. The unit housing 22 also including a housing cover 42 that mounts over the open end 41 of the main housing body 40 to enclose the first chamber 24. The housing cover 42 can attach to the main housing body 40 by fasteners such as bolts 43 (see FIG. 1). The second chamber 26 is defined within the housing cover 42. The second chamber 26 can optionally be re-enterable and can include an access panel or door for accessing the interior of the chamber 26. The housing cover 42 includes a base wall 44 having first and second opposite surfaces 46, 48. The second surface 48 is an upper surface that defines a portion (e.g., a base portion) of an interior of the second chamber 26 and is exposed to the interior of the second chamber 26. The first surface 46 is a bottom surface and is adapted to oppose and enclose the open end 41 of the main housing body 40 when the housing cover 42 is mounted on the main housing body 40. With the housing cover 42 mounted to the main housing body 40, the first surface 46 defines a top of the first chamber 24 and is exposed to an interior of the first chamber 24. Thus, the base wall 44 forms a common wall that separates the first and second chambers 24, 26 when the housing cover 42 is mounted on the main housing body 40.

Referring back to FIG. 2, the circuitry 27 can include a controller 248 which is shown interfacing with the user interface 250, the display 252, a sensing circuit 254, a cell power circuit 256, and an isolation circuit 258. The sensing circuit 254 can be configured to detect/sense the accumulation of gas within the first chamber 24. The cell power circuit 256 can be configured to supply electrical power to the first and second electrodes 34, 36. In one example, the cell power circuit 256 includes a current source 160 for driving a current through the electrolytic cell which is not dependent upon the load across the electrodes or the applied voltage. The magnitude, frequency and polarity of the current provided by the current source can be varied by the controller. The isolation circuit 258 transfers power from a power source 262 to the circuitry 27 and concurrently provides the circuitry 27 with a zero voltage reference that is electrically isolated from a boat ground 266. Further details of sensing circuitry, power circuitry, isolation circuitry and polarity switching circuitry are described in U.S. patent application Ser. No. 16/152,176, which is hereby incorporated by reference in its entirety. U.S. application Publication Ser. No. 16/843,328, filed Apr. 8, 2020, is also hereby incorporated by reference in its entirety.

In certain examples, the cell power circuit 256 includes the current source 160 (see FIG. 2). In certain examples, the controller 248 can control the current source 160 via a control line to vary the electrical current flowing between the first and second electrodes 74, 76 based on a water flow through the electrolytic cell (e.g., a volumetric flow rate, mass flow rate). The water flow can be determined by a reading from the flow sensor 51 (e.g., a flow meter) or other means (e.g., pump output data). Example flow sensors can include volumetric flow meters such as positive displacement flow meters, velocity flow meters, hall-effect flow meters (e.g., electrode paddle wheel flow meter) mass flow meters, ultrasonic flow meters and inferential flow meters. Depending upon the type of flow meter used, volumetric flow can be directly measured or calculated/estimated based on flow meter readings. In certain examples, the controller 248 can increase the magnitude of the electrical current with an increase in the water flow and decrease the magnitude of the electrical current with a decrease in the water flow so as to maintain a constant biocide concentration (or at least a biocide concentration within a target range) in the water discharged from the first chamber 24.

In certain examples, the controller 248 is configured to terminate power to the electrode arrangement when a flow stoppage is detected. The flow stoppage may be detected by a flow sensor such as the flow sensor 51, by monitoring the operational state (e.g., on or off state) of the water system pump, or other means.

Figure 5:
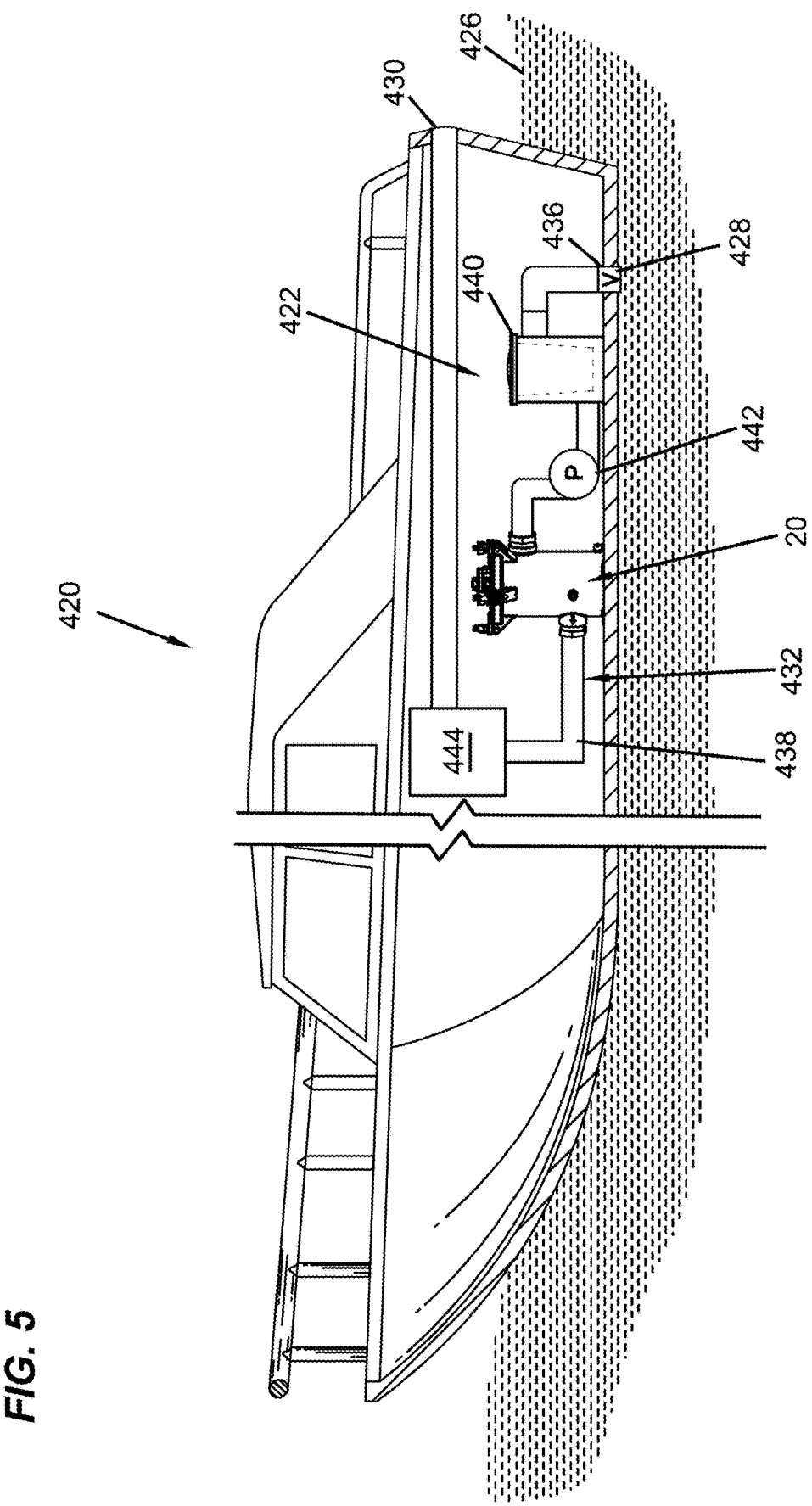
FIG. 5 illustrates a watercraft having an on-board water system incorporating the biocide-generating system of FIGS. 1-2.

FIG. 5 illustrates a watercraft 420 having an on-board water system 422 including the biocide-generating unit (or biocide-generating device) 20 in accordance with the principles of the present disclosure. The watercraft 420 is shown supported on a body of water 426. The on-board water system 422 includes an inlet 428, an outlet 430, and a water flow path 432 that extends from the inlet 428 through the watercraft 420 to the outlet 430. The inlet 428 is configured for drawing water from the body of water 426 into the water flow path 432. The inlet 428 is located below a water line 434 of the watercraft 420 and is preferably located at a bottom of the hull of the watercraft 420. The inlet 428 can be opened and closed by a valve 436 such as a seacock. The outlet 430 is configured for discharging water that has passed through the water flow path 432 back to the body of water 426. Preferably, the outlet 430 is positioned above the water line 434. The on-board water system 422 can include a plurality of components positioned along the water flow path 432. The water flow path 432 can include a plurality of conduits 438 (e.g., hoses, tubes, pipes, etc.) which extend between the components of the on-board water system 422 and function to carry water along the water flow path 432 between the various components. As shown at FIG. 5, the depicted components include a water strainer 440, a pump 442, and one or more systems and/or equipment 444 that make use of water conveyed through the water flow path 432. The biocide-generating device 20 is adapted for generating a biocide within the water of the water flow path 432 while the water passes through the biocide-generating device 20. The biocide is configured for inhibiting biofouling within the conduits 438 and within one or more of the components positioned along the water flow path 432. It will be appreciated that the biocide can also be referred to as a disinfecting agent or a cleaning agent since the biocide can also include disinfecting and cleaning properties.

It will be appreciated that examples of the type of the systems and/or equipment 444 that can benefit from biocide treatment can include cooling systems such as air conditioners or chillers where water drawn from the body of water 426 can be used as a cooling media for cooling refrigerant of the cooling systems. In other examples, the water from the water flow path 432 can be used to provide engine cooling.

Figure 6:
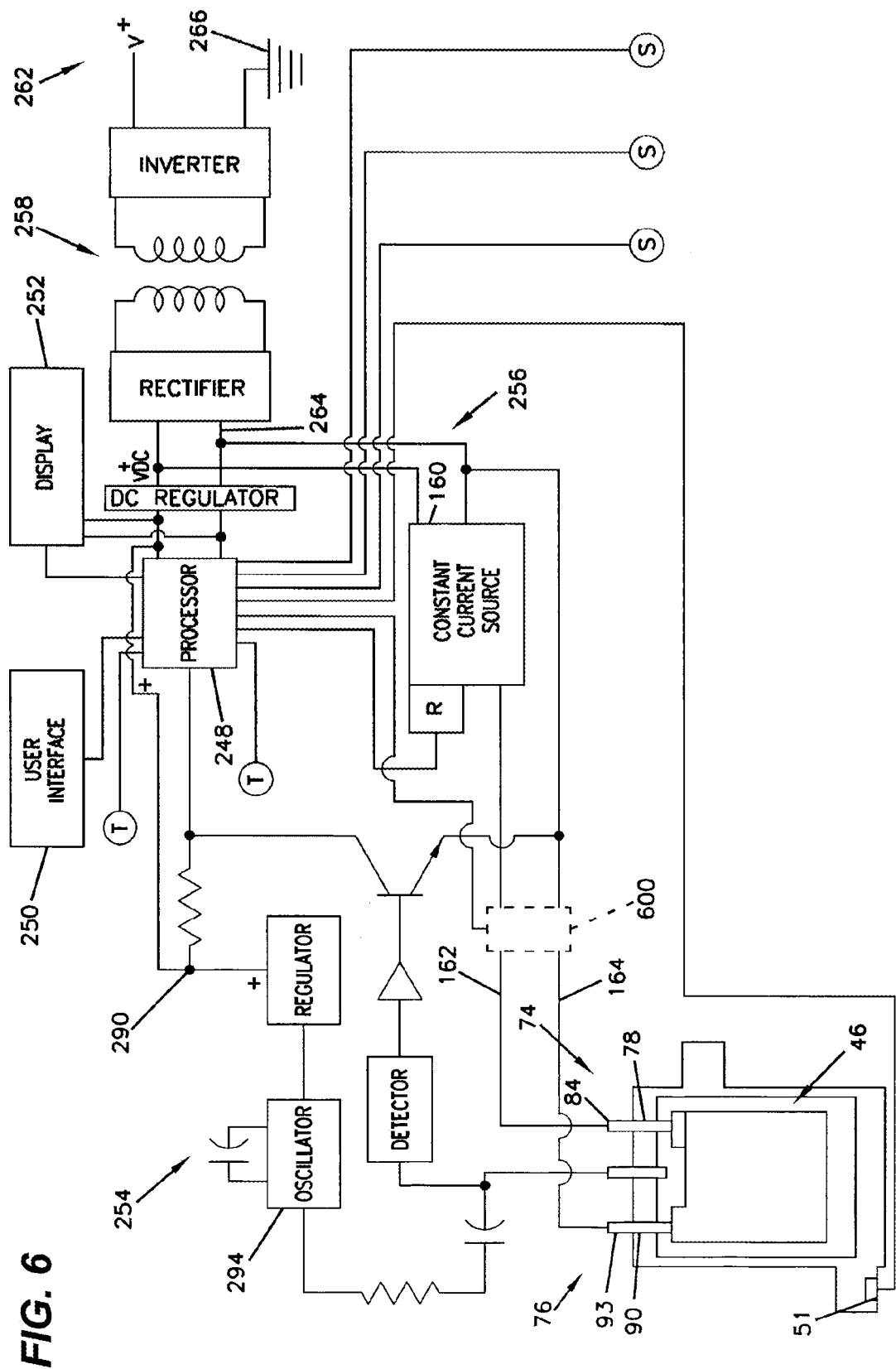
FIG. 6 depicts a schematic lay-out of an example biocide-generating device suitable for practicing aspects to the present disclosure.
Figure 7:
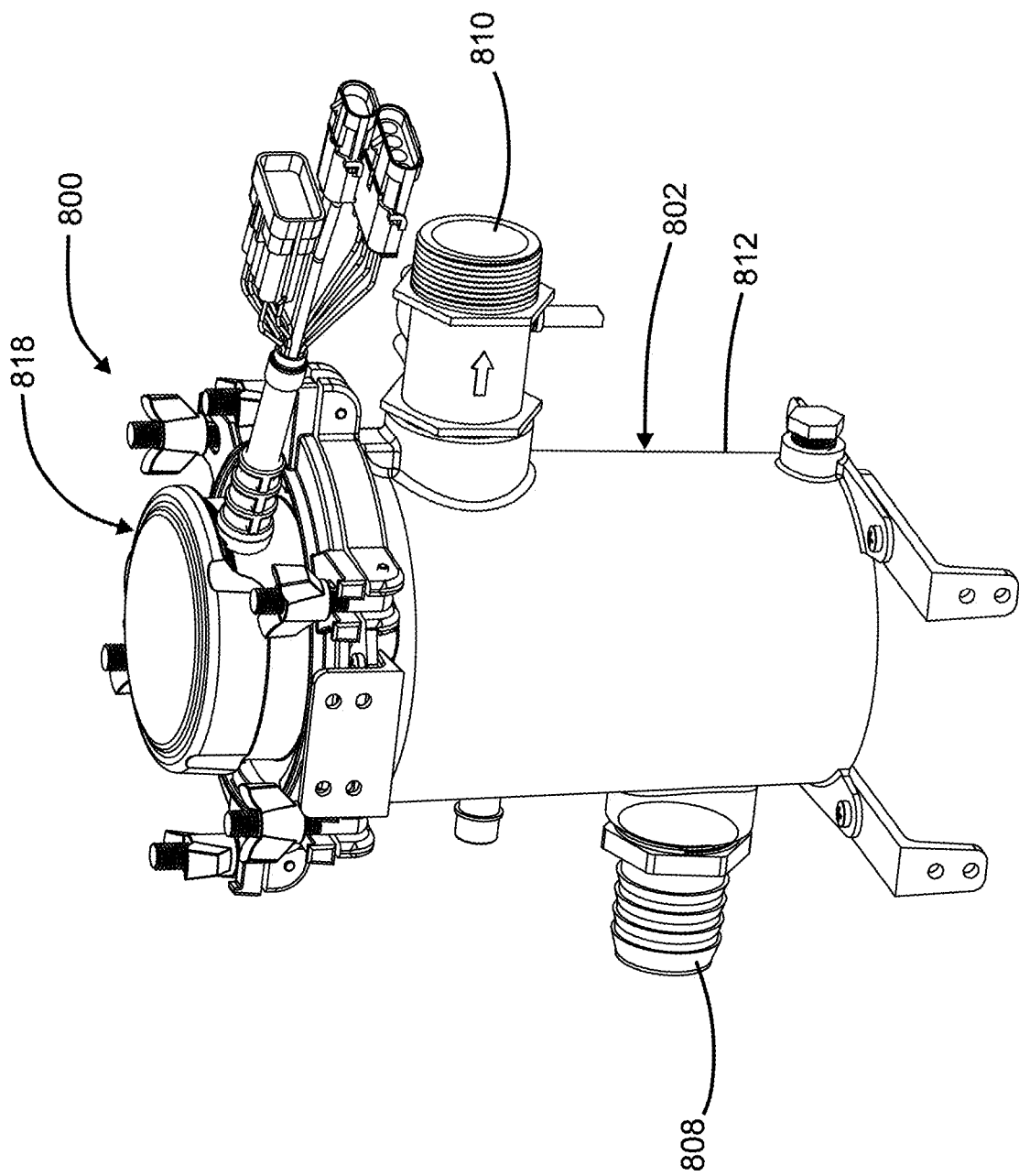
FIG. 7 is a perspective view of an electrolytic biocide-generating device in accordance with principles of the present disclosure.
Figure 8:
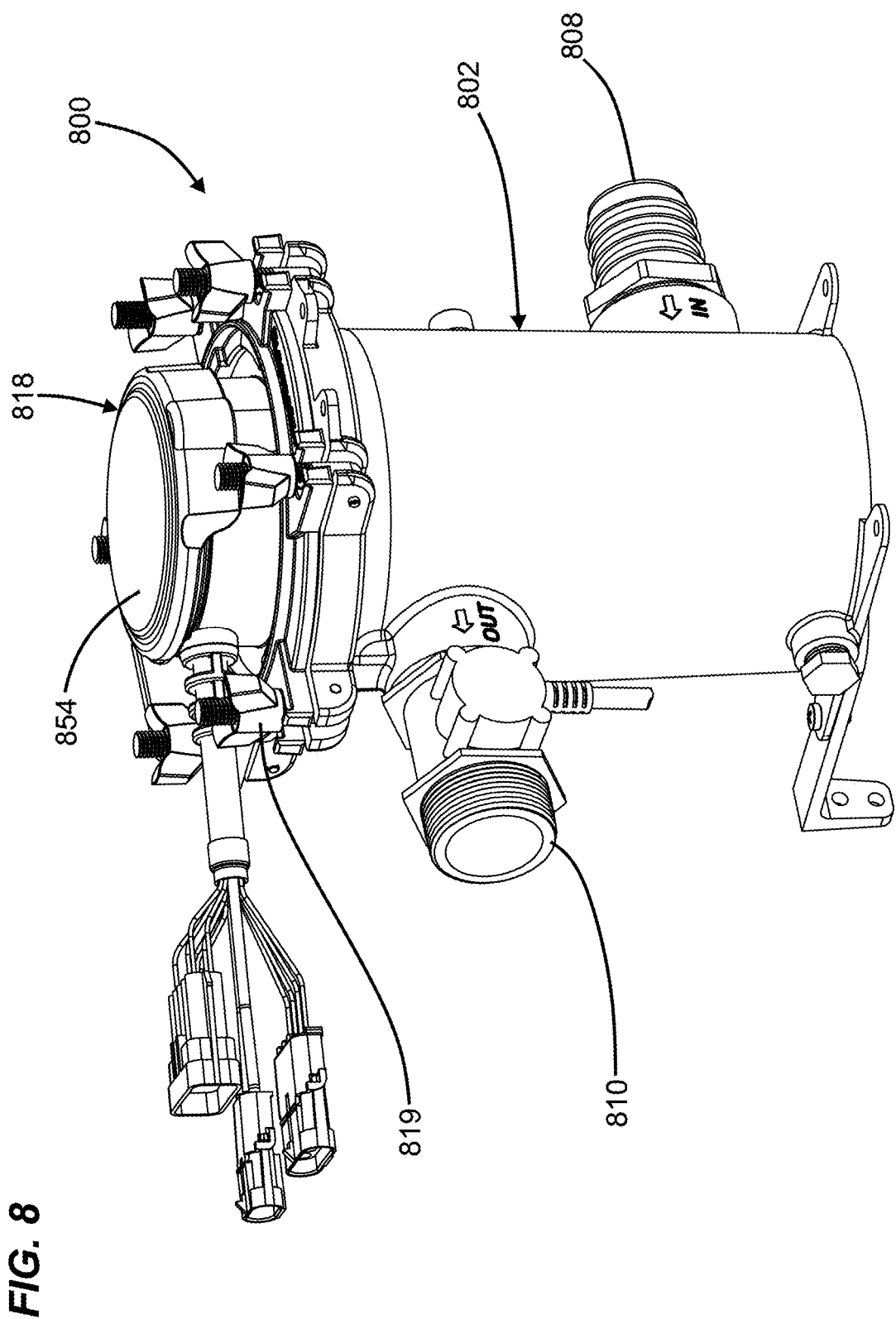
FIG. 8 is another perspective view of the biocide-generating device of FIG. 7.
Figure 9:
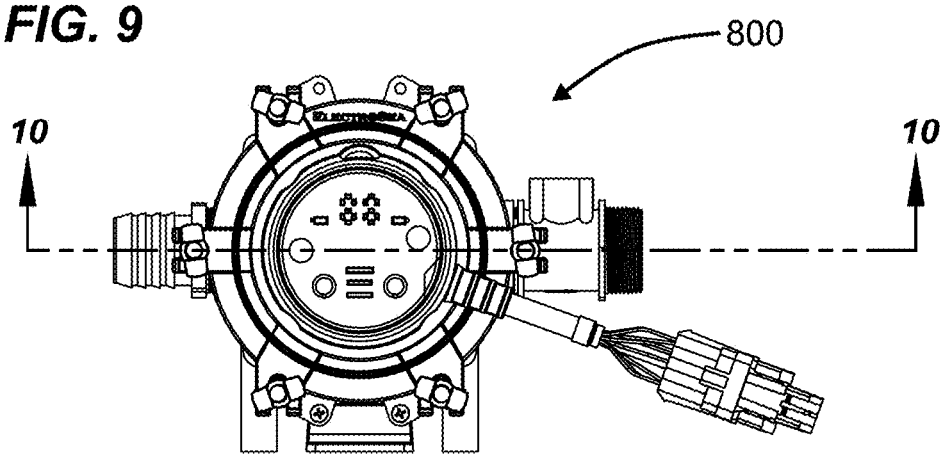
FIG. 9 is a top view of the biocide-generating device of FIG. 7.
Figure 10:
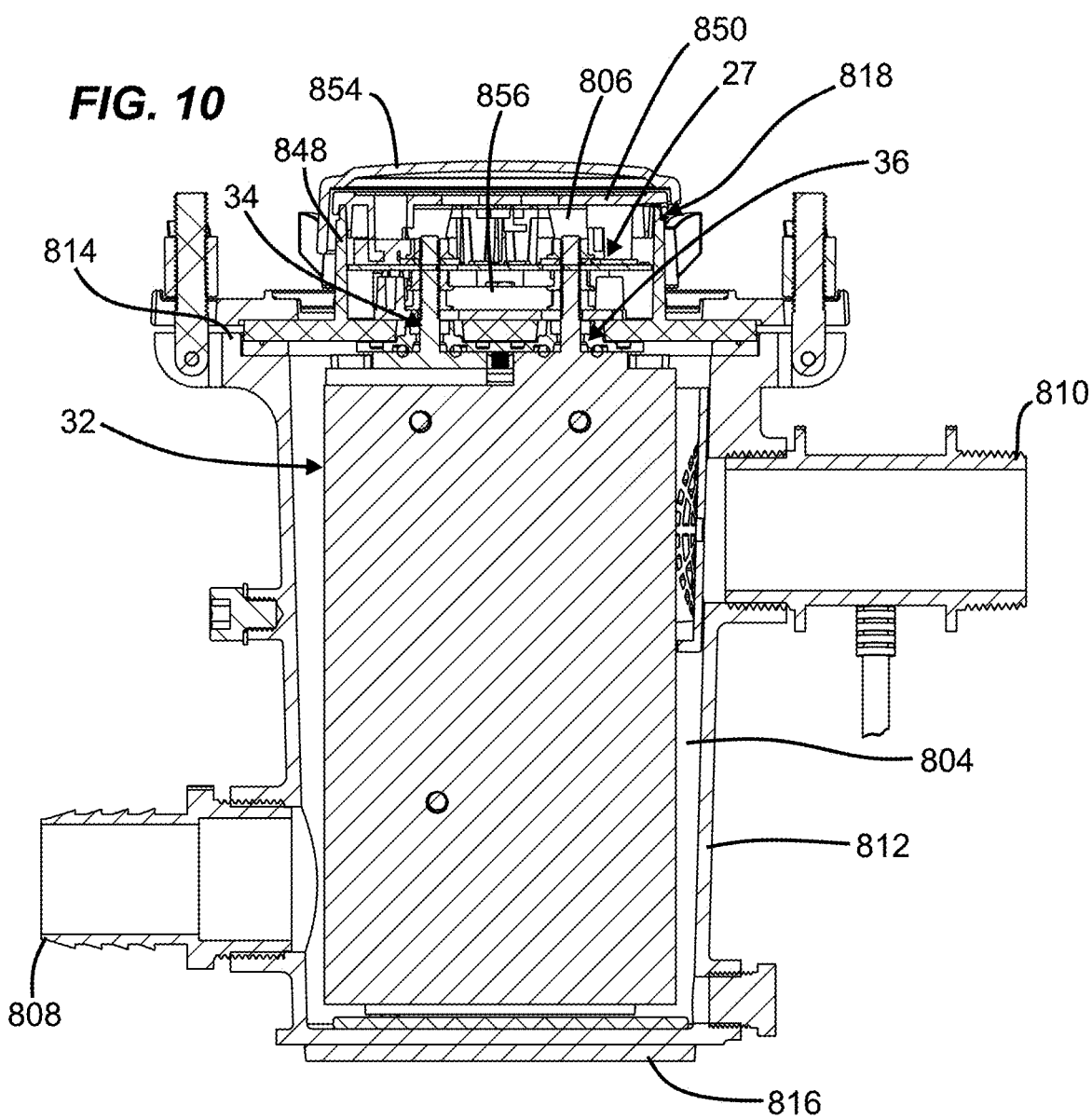
FIG. 10 is a cross-sectional view taken along section line 10-10 of FIG. 9.
Figure 11:
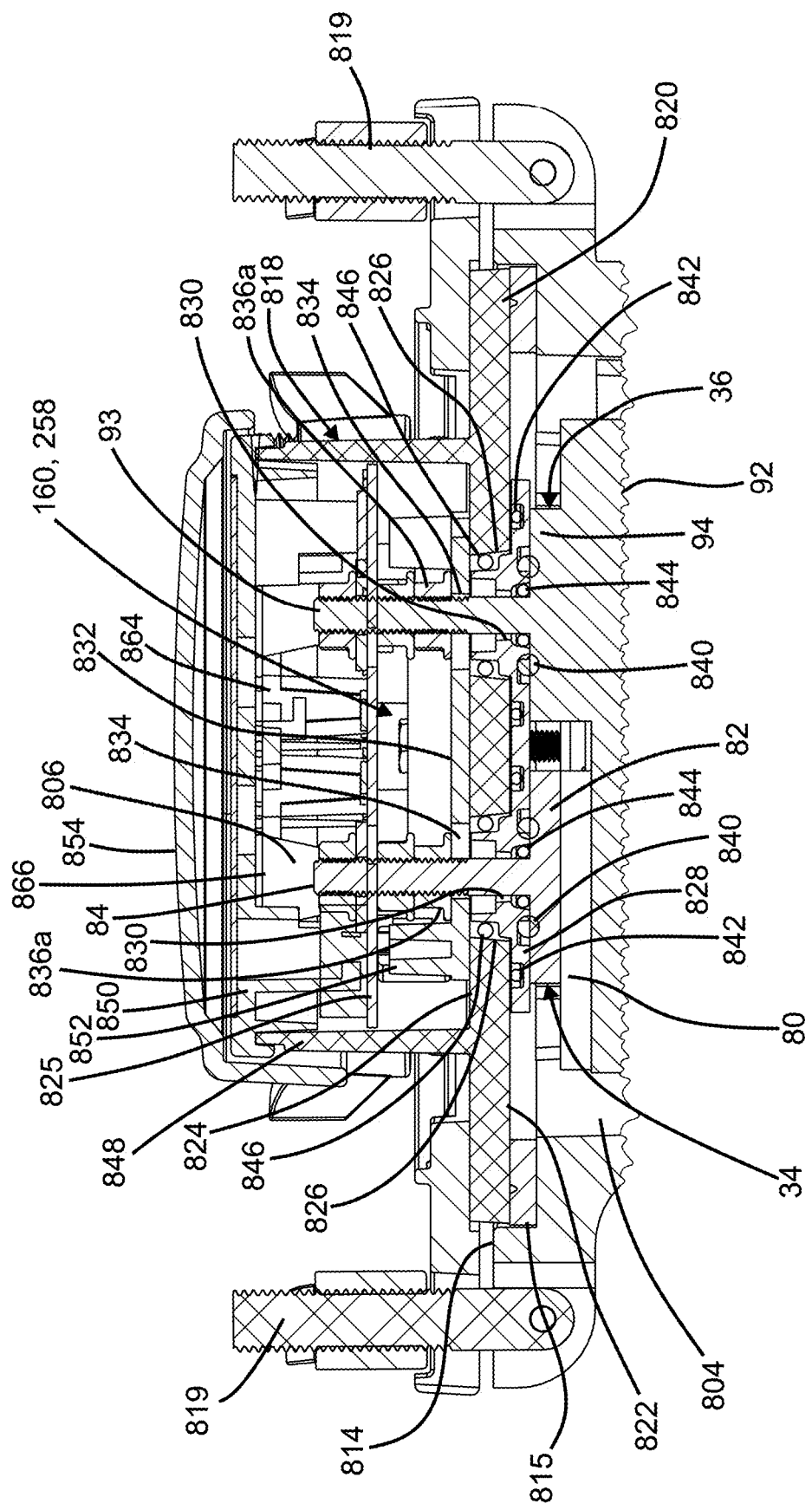
FIG. 11 is an enlarged view of a portion of FIG. 10.
Figure 12:
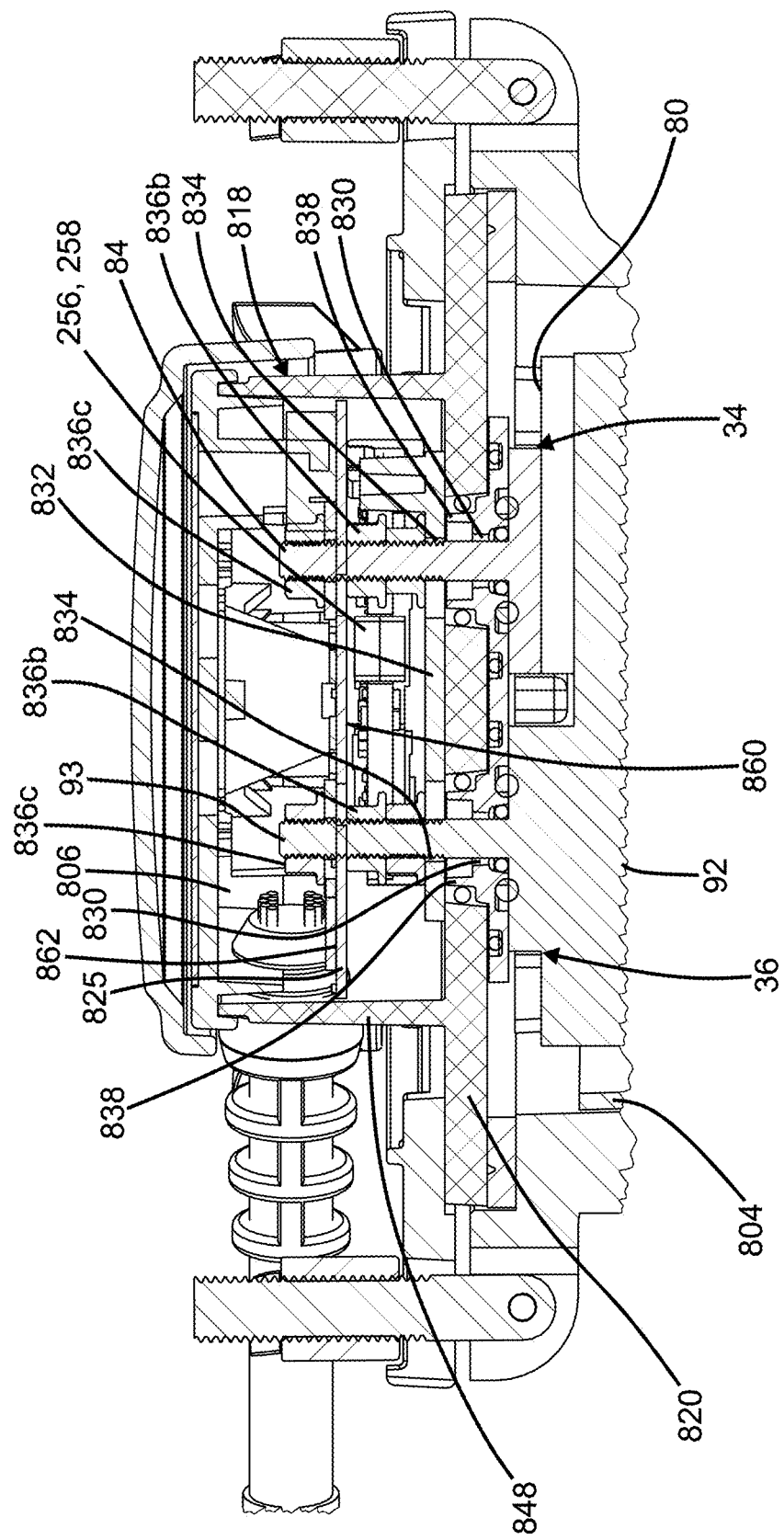
FIG. 12 is a cross-sectional view from an opposite perspective of the cross-sectional view of FIG. 11.
Figure 13:
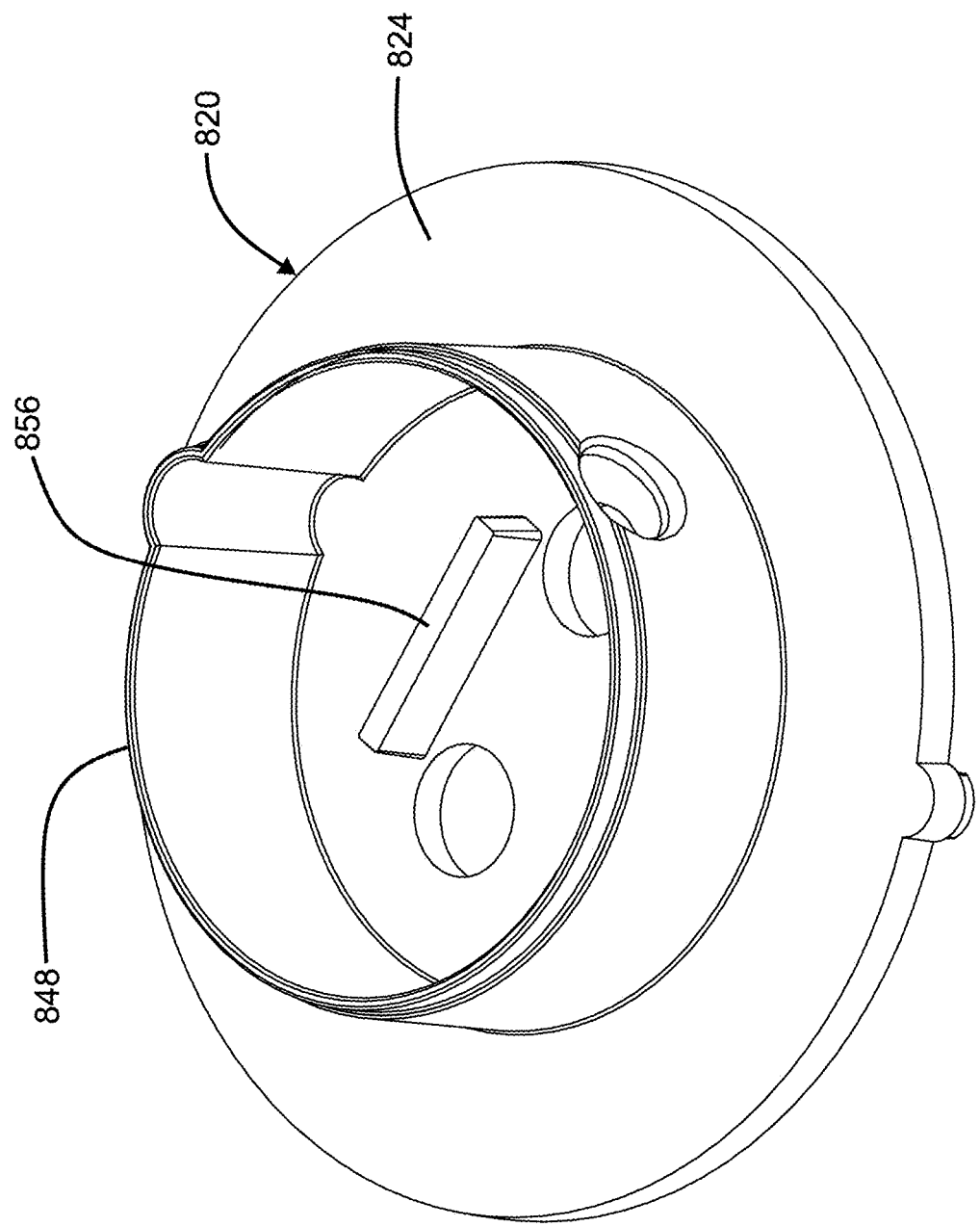
FIG. 13 is a top, perspective view of a housing cover plate of the biocide-generating device of FIG. 7.
Figure 14:
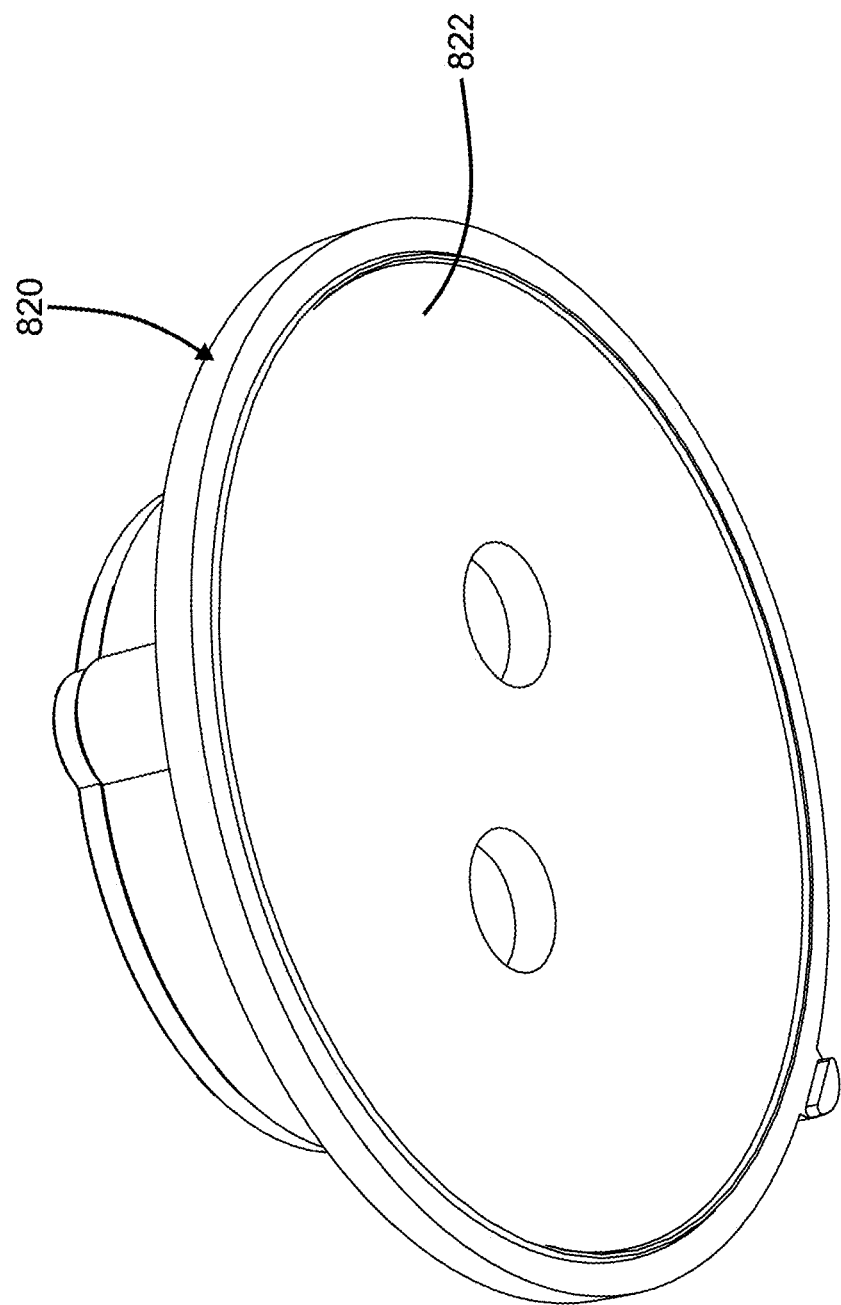
FIG. 14 is a bottom, perspective view of the housing cover plate of FIG. 13.
Figure 15:
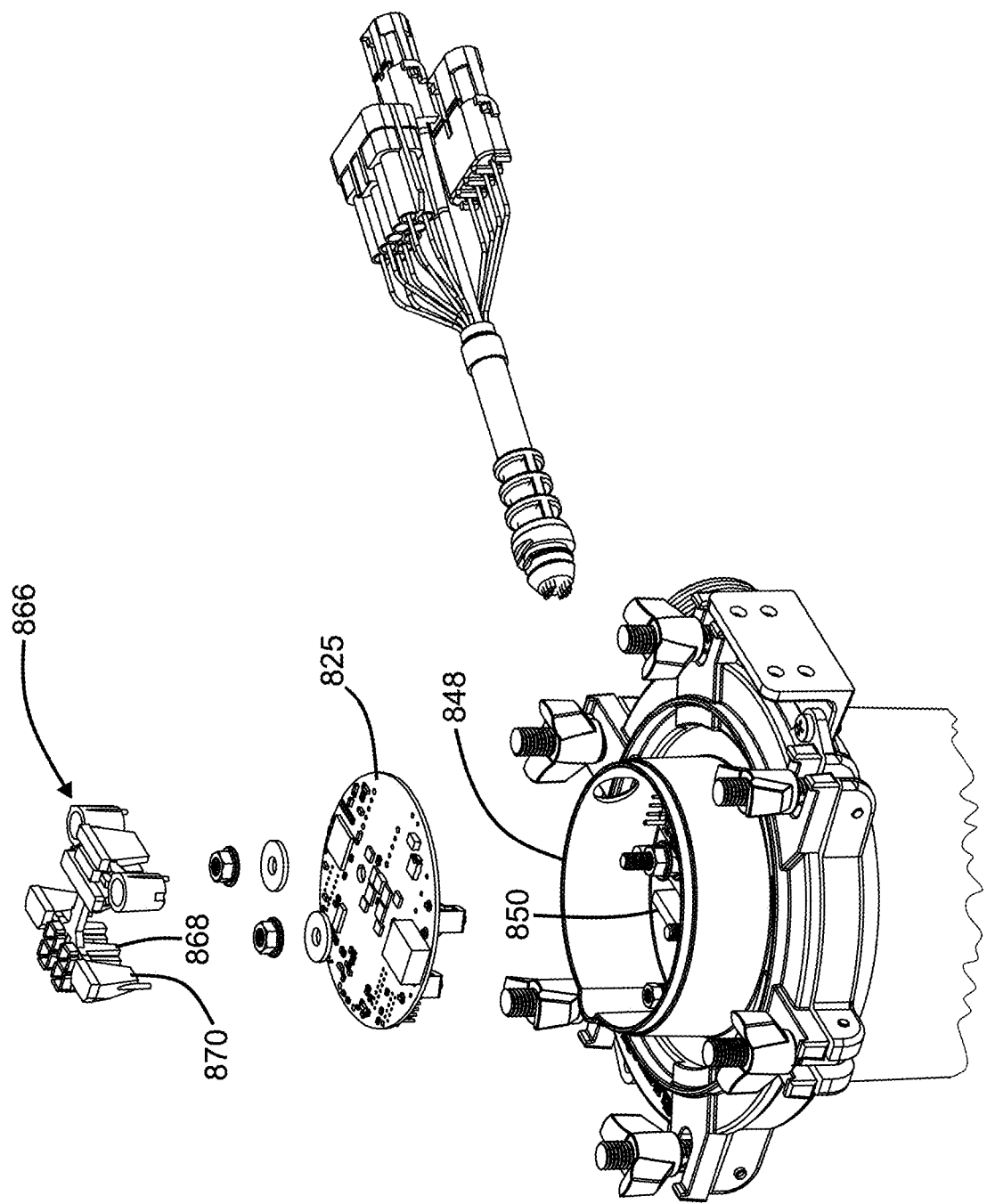
FIG. 15 is an exploded view of a housing cover of the device of FIG. 7.

Referring to FIG. 6, the cell power circuit 256 preferably includes switching device 600 which is preferably configured for alternating (e.g., switching, forward and reversing, etc.) the polarity of the electrolytic cell to inhibit the accumulation of scale on the electrodes as previously described. The switching device 600 can be configured in two different switch configurations corresponding to two different polarity states (e.g., polarity modes, polarity configurations, etc.) In a first switch configuration, the switching device 600 couples the constant current source 160 to the first terminal 78 (e.g., via lead 162) and couples the zero voltage reference 264 to the second terminal 90 (e.g., via lead 164). In the first switch configuration the electrodes 74, 76 are operated in a first polarity state in which the first electrode 74 is an anode and the second electrode 76 is a cathode. In a second switch configuration, the switching device 600 couples the constant current source 160 to the second terminal 90 (e.g., via lead 164) and couples the zero voltage reference 264 to the first terminal 78 (e.g., via lead 162), thereby reversing the polarity compared to the first switch configuration. In the second switch configuration the electrodes 74, 76 are operated in a second polarity state in which the first electrode 74 is a cathode and the second electrode 76 is an anode. By reversing the polarity of the electrodes 74, 76 back and forth between the first and second polarity states during time periods in which biocide is intended to be generated, the accumulation of scale on the electrode plates of the electrodes 74, 76 over time is reduced. Preferably, the first and second electrodes 74, 76 are temporarily electrically connected together (see FIG. 11) before switching from one electrode polarity state to another to provide an electrical short between the electrodes 74, 76.

FIGS. 7-12 depict an electrolytic biocide-generating device 800 in accordance with the principles of the present disclosure. The biocide-generating device 800 can include circuitry 27 and an electrode arrangement 32 of the type previously described herein, and can be used to provide in-situ biocide treatment of a boat water system as previously described herein. The biocide-generating device 800 can have a dual chamber configuration with a first chamber in which the electrode arrangement 32 is present for electrolytically generating biocide in water passing through the first chamber, and a second chamber for housing the circuitry 27. The chambers can be separated by a wall having a thermally conductive construction (e.g., a metal construction) which is adapted to provide cooling of the circuitry 27 by transferring heat generated by the circuitry 27 to the water flowing through the first chamber. The biocide-generating device 800 can have features for providing enhanced water sealing for preventing water from migrating from the first chamber to the second chamber. The biocide-generating device 800 can also have features for effectively electrically isolating the electrode arrangement 32 from features of the housing such as the wall that divides the housing into the first and second chambers. The biocide-generating device 800 can also have a configuration that enhances the transfer of heat through the dividing wall to water flowing though the electrolytic cell to provide effective cooling of the circuitry 27.

Referring to FIGS. 7-12, the biocide-generating device 800 includes a housing 802 defining a first chamber 804 and a second chamber 806. The housing 802 includes a water inlet 808 for receiving water from a water system of a boat into the first chamber 804 and a water outlet 810 for outputting water containing biocide to the water system of the boat.

The biocide-generating device 800 includes an electrode arrangement 32 including first and second electrodes 34, 36 positioned in the first chamber 804 for generating biocide in the water flowing through the first chamber 804. The biocide-generating device 800 also includes an electrical power circuit 256 for establishing a flow of electrical current between first and second electrodes 34, 36 of the electrode arrangement 32 for generating the biocide in the water flowing through the first chamber. The electrical power circuit 256 is positioned within the second chamber 806, and the device 800 is configured such that heat generated in the second chamber 806 (e.g., by the power circuit 256) is transferred to water flowing through the first chamber 804 to provide cooling of components within the second chamber 806.

The housing 802 of the device 800 includes a main housing body 812 defining the first chamber 804. The main housing body 812 has an open end 814 positioned opposite from a closed end 816. The housing 802 also includes a housing cover 818 that mounts over the open end 814 of the main housing body 812 to enclose the first chamber 804. A sealing gasket 815 can be provided between the main housing body 812 and the housing cover 818 and fasteners such as clamps 819 can be used to secure the housing cover 818 on the main housing body 812. The second chamber 806 is defined within the housing cover 818. The housing cover 818 includes a cover plate portion 820 having a thermally and electrically conductive construction (e.g., a metal construction). The cover plate portion 820 is adapted to cover the open end 814 of the main housing body 812 and functions as a dividing wall between the first sand second chambers 804, 806. The cover plate portion 820 has a first surface 822 that faces toward the first chamber 804 when the housing cover is mounted on the main housing body 812 and an opposite second surface 824 that faces toward the second chamber 806. The first surface 822 is adapted to be in contact with water flowing though the first chamber 804 and provides a substantial surface area for the transfer of heat to the water flowing through the first chamber 804.

The electrical power circuit 256 is integrated with a printed circuit board 825 within the second chamber 806. The electrical power circuit 256 includes a current source 160 positioned within the second chamber 806 for establishing a flow of current between the first and second electrodes 34, 36. The first and second electrodes 34, 36 are part of an electrode arrangement 32 including a plurality of interleaved electrolytic plates 80, 92 coupled to terminal posts 84, 93 that extend into the second chamber 806 through openings 826 in the cover plate portion 820 of the housing cover 818 and are electrically connected to the current source 160 via the printed circuit board 825.

The device 800 further includes an isolating arrangement for electrically isolating the electrode arrangement 32 from the housing 802. The isolating arrangement preferably includes components having a dielectric construction such as a plastic material construction. The isolating arrangement includes a first dielectric insulator plate 828 positioned at the first surface 822 of the cover plate portion 820 for electrically isolating the electrode arrangement 32 from the cover plate portion 820. The first dielectric insulator plate 828 defines openings 830 through which the terminal posts 84, 93 of the electrode arrangement 32 extend. The isolating arrangement also includes a second dielectric insulator plate 832 positioned at the second surface 824 of the cover plate portion 820 for electrically isolating the electrode arrangement 32 from the cover plate portion 820. The second dielectric insulator plate 832 defines openings 834 through which the terminal posts 84, 93 of the electrode arrangement 32 extend.

The biocide-generating device 800 also includes first nuts 836a threaded on the terminal posts 84, 93 of the electrode arrangement 32 for securing the electrode arrangement 32 to the housing cover 818. The terminal post 84, 93 are coupled to terminal blocks 82, 94 that are coupled to electrolytic plates 80, 92. The terminal posts 84, 93 extend through the printed circuit board 825 and tracings on the circuit board (or optionally other wiring) can be used to electrically connect the power circuit 256 to the electrodes 34, 36 via the terminal posts 84, 93. When the nuts 836a are threaded on the terminal posts 84, 93, the first dielectric insulator plate 828, the cover plate portion 820 and the second dielectric insulator plate 832 are clamped together between the nuts 836a and the terminal blocks 82, 94. The second dielectric insulator plate 832 electrically isolates the nuts 836a and thus the terminal posts 84, 93 from the cover plate portion 820.

The first dielectric insulator plate 828 includes projections 838 that are concentric with the openings 830 of the first dielectric insulator plate 828 and that extend into the openings 826 of the cover plate portion 820. The projections 838 surround the terminal posts 84, 93 and maintain separation between the terminal posts 84, 93 and the cover plate portion 820.

The biocide-generating device 800 further includes sealing arrangements corresponding to each of the terminal posts 84, 93. Each sealing arrangement includes a first sealing member 840 concentric with the terminal post 84, 93 for sealing between the first dielectric insulator plate 828 and the terminal block 82, 94. Each sealing arrangement also includes a second sealing member 842 concentric with the terminal post 84, 93 for sealing between the first dielectric insulator plate 828 and the first surface 822 of the cover plate portion 820. Each sealing arrangement further includes a third sealing member 844 concentric with the terminal post 84, 93 for sealing between the terminal post 84, 93 and the first dielectric insulator plate 828, and a fourth sealing member 846 concentric with the terminal post 84, 93 for sealing between one of the projections 838 of the first dielectric insulator plate 828 and the cover plate portion 820. It will be appreciated that the sealing members can be elastomeric members such as elastomeric rings (e.g., rubber o-rings). The biocide-generating device can further include potting material within the second chamber 806 for further sealing about the terminal posts. In certain examples, the potting material can fully fill the second chamber 806.

The biocide-generating device 800 also includes second nuts 836b which are threaded on the terminal posts 84, 93 to lock the first nuts 836a in place. The printed circuit board 825 is mounted on the terminal posts 84, 93 above the second nuts 836b and is clamped in place with respect to the second nuts 836b by third nuts 836c threaded on the terminal posts 84, 93.

The housing cover 818 includes a compartment side wall 848 unitary with the cover plate portion 820 that projects outwardly from the second surface 824 of the cover plate portion 820. The housing cover 818 includes a primary top cap 850 that mounts at an outer end of the compartment side wall 848 to enclose the second chamber 806. The primary top cap 850 can be secured at the outer end of the compartment side wall by fasteners that engage bosses 852 defined by the second dielectric insulator plate 832. A removeable secondary cap 854 that mounts over the primary top cap 850 can also be used to protect and cover the display of the biocide-generating device 800.

In one example, the cover plate portion 820 has a metal construction, and a metal heat transfer member 856 (e.g., a heat sink member) is unitary with the cover plate portion 820 and projects outwardly from the second surface 824 of the cover plate portion 820. The heat transfer member 856 is positioned to transfer heat from an electronic component on the printed circuit board 825 to the cover plate portion 820. A thermally conductive pad can be used to thermally couple the heat transfer member 856 to the heat generating component on the circuit board 825. In one example, the heat transfer member is thermally coupled to the current source 160.

The printed circuit board 825 is spaced outwardly from the second surface 824 of the cover plate portion 820 and includes a bottom side 860 (e.g., a first major side) that faces toward the second surface 824 of the cover plate portion 820 and a top side 862 (e.g., a second major side) that faces toward a location of a display 864 of the housing cover 818. The current source 160 and a power supply isolation circuit 258 are positioned at the bottom side 860 of the printed circuit board 825 and light emitting diodes and actuatable buttons are positioned at the top side 862 of the printed circuit board 825. A substrate 866 made of a light conveying material (e.g., a molded light-transmitting plastic) is mounted at the top side 862 of the printed circuit board 825. The substrate 866 includes a plurality of light pipes 868 for directing light from the light emitting diodes to the display 864. The substrate 866 also includes extensions 870 (e.g., force transfer members for transferring a manual pressing force) for allowing the actuatable buttons to be manually actuated from the display 864. The power supply isolation circuit 258 is thermally coupled the second surface 824 of the cover plate portion 820 (e.g., by a thermally conductive pad) and the current source 160 is thermally coupled to the heat sink member that projects from the cover plate portion 820. The first surface 822 of the cover plate portion 820 is positioned to contact water flowing through the first chamber 804 and provides a relatively large surface area for transferring heat.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A biocide-generating device comprising:
a housing defining a first chamber and a second chamber, the housing including a water inlet for receiving water from the water system into the first chamber and a water outlet for outputting water containing biocide to the water system;
an electrode arrangement including first and second electrodes positioned in the first chamber for generating biocide in the water within the first chamber; and
an electrical power circuit for establishing a flow of electrical current between first and second electrodes of the electrode arrangement for generating the biocide in the water within the first chamber, the electrical power circuit being positioned within the second chamber;
wherein the device is configured such that heat generated in the second chamber is transferred to water flowing through the first chamber to provide cooling of components within the second chamber;
wherein the housing includes a main housing body defining the first chamber, the main housing body having an open end, the housing also including a housing cover that mounts over the open end of the main housing body to enclose the first chamber, the second chamber being defined within the housing cover, the housing cover including a cover plate portion adapted to cover the open end of the main housing body, the cover plate portion having a first surface that faces toward the first chamber when the housing cover is mounted on the main housing body and an opposite second surface that faces toward the second chamber, the cover plate portion having a metal construction;
wherein the electrical power circuit is integrated with a printed circuit board within the second chamber, wherein the electrical power circuit includes a current source positioned within the second chamber for establishing a flow of current between the first and second electrodes, wherein the first and second electrodes are part of an electrode arrangement including a plurality of interleaved electrolytic plates coupled to terminal posts that extend into the second chamber through openings in the cover plate portion of the housing cover and are electrically connected to the current source via the printed circuit board, wherein the circuit board is mounted in the second chamber in an orientation in which first and second major sides of the printed circuit board are transversely oriented relative to axes of the terminal posts and also transversely oriented relative to the interleaved electrolytic plates, wherein the printed circuit board defines an outer boundary and wherein axes of the terminal posts extend through the first and second major sides of the printed circuit board at locations inside the outer boundary of the printed circuit board, the device further comprising:
a dielectric insulator arrangement positioned at the second surface of the cover plate portion for electrically isolating the electrode arrangement from the cover plate portion;
a one-piece dielectric insulator plate positioned at the first surface of the cover plate portion for electrically isolating the electrode arrangement from the cover plate portion, the dielectric insulator plate defining openings through which the terminal posts of the electrode arrangement extend, the dielectric insulator plate including projections that are concentric with the openings of the dielectric insulator plate and that extend into the openings of the cover plate portion, the projections surrounding the terminal posts and maintaining separation between the terminal posts and the cover plate portion, the dielectric insulator plate also defining first grooves having open sides that face toward the first surface of the cover plate portion and second grooves having open sides that face away from the first surface of the cover plate portion, wherein one of each of the first and second grooves are concentric with respect to each of the terminal posts, and wherein the first grooves are outwardly radially offset from their corresponding second grooves; and a sealing arrangement including first seals positioned in the first grooves for sealing against the first surface of the cover plate portion and second seals positioned in the second grooves for sealing against terminal blocks that couple the terminal posts to the electrolytic plates.

2. The biocide-generating device of claim 1, further comprising nuts threaded on the terminal posts of the electrode arrangement for securing the electrode arrangement to the housing cover, wherein the terminal posts are coupled to the terminal blocks that are coupled to the electrolytic plates, and wherein when the nuts are threaded on the terminal posts of the electrode arrangement, the cover plate portion, the dielectric insulator plate, and the dielectric insulator arrangement are clamped together between the nuts and the terminal blocks, and wherein the dielectric insulator arrangement electrically isolates the nuts from the second side of the cover plate portion.

3. The biocide-generating device of claim 2, wherein the nuts are first nuts, wherein second nuts are threaded on the terminal posts to lock the first nuts in place, wherein the printed circuit board is mounted on the terminal posts above the second nuts and is clamped in place with respect to the second nuts by third nuts threaded on the terminal posts such that the printed circuit board is compressed between the second and third nuts.

4. The biocide-generating device of claim 1, further comprising potting material within the second chamber for further sealing about the terminal posts.

5. The biocide-generating device of claim 1, wherein the housing cover includes a compartment side wall unitary with the cover plate portion that projects outwardly from the second surface of the cover plate portion, and wherein the housing cover includes a primary top cap that mounts at an outer end of the compartment side wall to enclose the second chamber.

6. The biocide-generating device of claim 5, wherein the primary top cap is secured at the outer end of the compartment side wall by fasteners that engage bosses defined by the dielectric insulator arrangement.

7. The biocide-generating device of claim 6, further comprising a removeable secondary cap that mounts over the primary top cap.

8. The biocide-generating device of claim 1, wherein a metal heat transfer member is positioned within the second chamber between the printed circuit board and the second surface of the cover plate portion and is configured to transfer heat away from an electronic component on the printed circuit board.

9. The biocide-generating device of claim 8, wherein the electronic component is a current source which is thermally coupled to the heat transfer member by a thermal pad.

10. The biocide-generating device of claim 1, wherein the printed circuit board is spaced outwardly from the second surface of the cover plate portion and the bottom side faces toward the second surface of the cover plate portion and the top side faces toward a display location of the housing cover.

11. The biocide-generating device of claim 10, wherein the current source and a power supply isolation circuit are positioned at the bottom side of the printed circuit board and light emitting diodes and actuatable buttons are positioned at the top side of the printed circuit board.

12. The biocide-generating device of claim 11, wherein a substrate made of a light conveying material is mounted at the top side of the printed circuit board, wherein the substrate includes a plurality of light pipes for directing light from the light emitting diodes to the display, the substrate also including extensions for allowing the actuatable buttons to be manually actuated from the display.

13. The biocide-generating device of claim 11, wherein the power supply isolation circuit is thermally coupled to the second side of the cover plate portion and the current source is thermally coupled to a heat sink member that projects from the cover plate portion, and wherein the first side of the cover plate portion is positioned to contact water flowing through the first chamber.

14. The biocide-generating device of claim 1, wherein the housing defines a length, wherein the electrolytic plates are parallel with respect to the length, and wherein the printed circuit board is transverse with respect to the length.

15. A biocide-generating device comprising:

a device structure defining a first chamber and a second chamber, the device structure including a water inlet for receiving water from the water system into the first chamber and a water outlet for outputting water containing biocide to the water system;

an electrode arrangement including first and second electrodes positioned in the first chamber for generating biocide in the water within the first chamber; and an electrical power circuit for establishing a flow of electrical current between first and second electrodes of the electrode arrangement for generating the biocide in the water within the first chamber, the electrical power circuit being positioned within the second chamber;

wherein the device structure includes a main housing body defining the first chamber, the water inlet and the water outlet, the main housing body having an open end, the device structure also including a cover plate portion that mounts over the open end of the main housing body to enclose the first chamber, the second chamber being defined by housing structure secured to and carried with the cover plate portion, the cover plate portion having a first surface that faces toward the first chamber when the cover plate portion is mounted on the main housing body and an opposite second surface that faces toward the second chamber;

wherein the electrical power circuit is integrated with a printed circuit board within the second chamber, wherein the electrical power circuit includes a current source positioned within the second chamber for establishing a flow of current between the first and second electrodes, wherein the first and second electrodes are part of an electrode arrangement including a plurality of interleaved electrolytic plates coupled to terminal posts that extend through openings in the cover plate portion and that are electrically connected to the current source, wherein the circuit board is mounted in the second chamber in an orientation in which first and second major sides of the printed circuit board are transversely oriented relative to axes of the terminal posts, wherein the printed circuit board defines an outer boundary and wherein the axes of the terminal posts extend through the first and second major sides of the printed circuit board at locations inside the outer boundary of the printed circuit board, wherein the first major side of the printed circuit board is a bottom side that faces toward the first chamber and the second major side of the printed circuit board is a top side that faces away from the first chamber, wherein the current source is mounted to the first major side of the printed circuit board, and wherein the current source opposes and is thermally coupled to a metallic heat sink member within the second chamber at a location below the first major side, the metallic heat sink member being a metallic block.

16. The biocide generating device of claim 15, wherein the second chamber has a round perimeter shape and the outer boundary of the printed circuit board is circular.

17. The biocide-generating device of claim 15, further comprising a thermal pad for thermally coupling the metallic heat sink member to the current source.

18. The biocide-generating device of claim 15, wherein the cover plate portion has a metallic construction, wherein the first surface of the cover plate portion is exposed to an interior of the first chamber, and wherein the metallic heat sink member transfers heat from the current source to the cover plate portion.

19. The biocide-generating device of claim 15, further comprising a metallic wall that extends about a perimeter of the second chamber and projects in a direction upwardly from the cover plate portion.

20. A biocide-generating device comprising:
a device structure defining a first chamber and a second chamber, the device structure including a water inlet for receiving water from the water system into the first chamber and a water outlet for outputting water containing biocide to the water system;
an electrode arrangement including first and second electrodes positioned in the first chamber for generating biocide in the water within the first chamber; and
an electrical power circuit for establishing a flow of electrical current between first and second electrodes of the electrode arrangement for generating the biocide in the water within the first chamber, the electrical power circuit being positioned within the second chamber;
wherein the device structure includes a main housing body defining the first chamber, the water inlet and the water outlet, the main housing body having an open end, the device structure also including a cover plate portion that removably mounts over the open end of the main housing body to enclose the first chamber, the second chamber being defined by housing structure secured to and carried with the cover plate portion, the cover plate portion having a first surface that faces toward the first chamber when the cover plate portion is mounted on the main housing body and an opposite second surface that faces toward the second chamber;
wherein the electrical power circuit is integrated with a printed circuit board within the second chamber, wherein the electrical power circuit includes a current source positioned within the second chamber for establishing a flow of current between the first and second electrodes, wherein the first and second electrodes are part of an electrode arrangement including a plurality of interleaved electrolytic plates, wherein the printed circuit board includes a bottom side that faces toward the first chamber and a top side that faces away from the first chamber, wherein the current source is mounted to the bottom side of the printed circuit board, wherein the current source is thermally coupled to a metallic heat sink member within the second chamber that projects in a direction upwardly directly from the cover plate portion and includes an upwardly facing surface that faces toward a downwardly facing surface of the current source, the downwardly facing surface of the current source being located below the bottom side of the printed circuit board, wherein the housing structure includes a user interface and display positioned above the top side of the printed circuit board that is accessible from outside the device structure, wherein light emitting diodes for illuminating the display and actuatable buttons corresponding to the user interface are provided at the top side of the printed circuit board, and wherein the metallic heat sink member is a metallic heat sink block.

21. The biocide-generating device of claim 20, further comprising a thermal pad for thermally coupling the upwardly facing surface of the metallic heat sink member to the current source.

22. The biocide-generating device of claim 20, wherein the cover plate portion has a metallic construction, wherein the first surface of the cover plate portion is exposed to an interior of the first chamber, and wherein the metallic heat sink member transfers heat from the current source to the cover plate portion.

23. The biocide-generating device of claim 22, wherein the metallic heat sink member is unitary with the cover plate portion.

24. The biocide-generating device of claim 20, further comprising a metallic wall that extends about a perimeter of the second chamber and projects in a direction upwardly from the cover plate portion.

25. The biocide-generating device of claim 24, wherein the metallic wall is unitary with the cover plate portion.

\* \* \* \* \*